(12) United States Patent
Yin et al.

(10) Patent No.: US 9,893,899 B2
(45) Date of Patent: Feb. 13, 2018

(54) NETWORK CONNECTION RE-ESTABLISHMENT METHOD, RELATED DEVICE AND SYSTEM

(71) Applicant: Huawei Technologies Co., Ltd., Shenzhen, Guangdong (CN)

(72) Inventors: Yu Yin, Shanghai (CN); Caixia Qi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 105 days.

(21) Appl. No.: 14/979,378

(22) Filed: Dec. 27, 2015

(65) Prior Publication Data

US 2016/0127136 A1 May 5, 2016

Related U.S. Application Data

(63) Continuation of application No. PCT/CN2014/080388, filed on Jun. 20, 2014.

(30) Foreign Application Priority Data

Jun. 26, 2013 (CN) .......................... 2013 1 0260177

(51) Int. Cl.
*H04L 12/26* (2006.01)
*H04L 12/12* (2006.01)
(Continued)

(52) U.S. Cl.
CPC .............. *H04L 12/12* (2013.01); *H04L 12/66* (2013.01); *H04L 41/0672* (2013.01);
(Continued)

(58) Field of Classification Search
CPC . H04W 76/027; H04W 26/028; H04W 88/12; H04W 92/22
(Continued)

(56) References Cited

U.S. PATENT DOCUMENTS 8,200,830 B2 * 6/2012 Ramankutty ......... H04W 24/08
709/206
8,787,226 B2 * 7/2014 Yin ....................... H04W 24/04
370/310
(Continued)

FOREIGN PATENT DOCUMENTS

CN 101547168 A 9/2009
CN 102893637 A 1/2013
(Continued)

OTHER PUBLICATIONS

"3rd Generation Partnership Project; Technical Specification Group Core Network and Terminals; Restoration procedures (Release 12)", 3GPP TS 23.007 V12.1.0, Jun. 2013, 81 pages.
(Continued)

*Primary Examiner* — Dmitry H Levitan

(57) ABSTRACT

An embodiment of the present invention discloses a network connection re-establishment method, including: detecting whether gateway resetting occurs, and if it is detected that gateway resetting occurs, sending a network connection re-establishment trigger message to an access node when a downlink packet sent by a packet data network is received, where the access node re-establishes, according to a type of the gateway resetting, a network connection corresponding to the downlink packet, and the type of the gateway resetting is resetting of a data gateway or resetting of a serving gateway. The present invention can be used to quickly re-establish a network connection, and can be applied to a situation in which a serving gateway and a data gateway are integrated.

17 Claims, 8 Drawing Sheets

(51) Int. Cl.
| | |
|---|---|
| H04W 76/02 | (2009.01) |
| H04L 12/66 | (2006.01) |
| H04L 12/24 | (2006.01) |
| H04L 12/939 | (2013.01) |
| H04W 72/04 | (2009.01) |
| H04W 88/16 | (2009.01) |
| H04W 88/02 | (2009.01) |
| H04W 88/08 | (2009.01) |

(52) U.S. Cl.
 CPC ....... *H04L 49/557* (2013.01); *H04W 72/0406* (2013.01); *H04W 76/028* (2013.01); *H04W 88/02* (2013.01); *H04W 88/08* (2013.01); *H04W 88/16* (2013.01)

(58) Field of Classification Search
 USPC ................ 370/216, 248, 310, 328, 341, 349
 See application file for complete search history.

(56) References Cited

U.S. PATENT DOCUMENTS

| | | | | |
|---|---|---|---|---|
| 8,848,516 | B2* | 9/2014 | Sahin | .................... H04W 36/12 370/225 |
| 8,929,335 | B2* | 1/2015 | Wang | .................... H04W 24/04 370/331 |
| 9,143,997 | B2* | 9/2015 | Lu | .......................... H04W 24/04 |
| 9,210,596 | B1* | 12/2015 | Chen | .................... H04W 76/028 |
| 9,313,094 | B2* | 4/2016 | Qiang | .................... H04W 24/04 |
| 2010/0208596 | A1* | 8/2010 | Jin | .......................... H04L 41/06 370/242 |
| 2013/0044608 | A1 | 2/2013 | Qiang et al. | |
| 2013/0083670 | A1 | 4/2013 | Qiang | |

FOREIGN PATENT DOCUMENTS

| | | |
|---|---|---|
| CN | 103338525 A | 10/2013 |
| WO | WO 2011/127861 A2 | 10/2011 |
| WO | WO 2012/035450 A2 | 3/2012 |
| WO | WO 2012/097527 A1 | 7/2012 |

OTHER PUBLICATIONS

"3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)", 3GPP TS 29.274 V12.1.0, Jun. 2013, 228 pages.

* cited by examiner

US 9,893,899 B2

NETWORK CONNECTION RE-ESTABLISHMENT METHOD, RELATED DEVICE AND SYSTEM

CROSS-REFERENCE TO RELATED APPLICATIONS

This application is a continuation of International Application No. PCT/CN2014/080388, filed on Jun. 20, 2014, which claims priority to Chinese Patent Application No. 201310260177.0, filed on Jun. 26, 2013, both of which are hereby incorporated by reference in their entireties.

TECHNICAL FIELD

The present invention relates to the communications field, and in particular, to a network connection re-establishment method and a related device and system.

BACKGROUND

In a logical architecture system of an enhanced packet switch (EPS) mobile communications network, a user equipment (UE) accesses a mobile communications network by using a radio access network, an access node is a convergence point of the radio access network, a serving gateway is a local access gateway of the UE, and a data gateway is a gateway for the UE to access an external data network. After resetting occurs on a network node such as the access node, the serving gateway, or the data gateway, user information on the reset network node, such as information about a UE context, a Packet Data Protocol (PDP) context, and a packet data network (PDN) connection context, may be lost. If a network connection of the UE that is affected by the resetting of the network node cannot be re-established in time, after a downlink packet of the UE reaches the reset network node, the reset network node may discard the packet because the packet is not corresponding to specific user information.

At present, a method of network connection re-establishment performed due to resetting of a network gateway is mainly as follows: if resetting occurs on a serving gateway, after a data gateway learns that the serving gateway is reset, the data gateway selects a serving gateway and sends a downlink packet notification message to the serving gateway, the serving gateway selected by the data gateway forwards the downlink packet notification message to an access node, and the access node re-selects a serving gateway and performs a serving gateway switching procedure, and re-establishes a UE context on the new serving gateway, to implement network connection re-establishment; or, if resetting occurs on a data gateway, after a serving gateway learns that the data gateway is reset, the serving gateway sends a data gateway resetting notification message to an access node, and the access node initiates a PDP deactivation procedure, a PDN connection deletion procedure, or a detach procedure to trigger a user equipment to re-establish a PDP or PDN connection, to implement network connection re-establishment.

A reset detection mechanism may be not timely, so that a part of downlink data of cannot reach the UE. In an actual network, a serving gateway and a data gateway are usually integrated, and when the serving gateway or the data gateway is reset, the other gateway is also reset. Therefore, the foregoing method cannot implement network connection re-establishment in a situation in which the serving gateway and the data gateway are integrated.

SUMMARY

Embodiments of the present invention provide a network connection re-establishment method and a related device and system, which can quickly re-establish a network connection after gateway resetting occurs, and can be applied to a situation in which a serving gateway and a data gateway are integrated.

A first aspect of the present application provides a network connection re-establishment method, including:

detecting whether gateway resetting occurs, and if it is detected that gateway resetting occurs, sending a network connection re-establishment trigger message to an access node when a downlink packet sent by a packet data network is received, where the access node determines a type of the gateway resetting and re-establishes, according to the type of the gateway resetting, a network connection corresponding to the downlink packet, and the type of the gateway resetting is resetting of a data gateway or resetting of a serving gateway.

In a first possible implementation manner of the first aspect, if the type of the gateway resetting is resetting of a data gateway, the network connection re-establishment trigger message includes a user equipment Internet Protocol address, where the user equipment Internet Protocol address is extracted from the downlink packet; or if the type of the gateway resetting is resetting of a serving gateway, the network connection re-establishment trigger message includes a user identifier and a bearer identifier that are corresponding to the downlink packet, where the user identifier and the bearer identifier that are corresponding to the downlink packet are obtained by querying locally stored user information.

With reference to the first possible implementation manner of the first aspect, in a second possible implementation manner, the network connection re-establishment trigger message includes a gateway resetting type indication information element, and the gateway resetting type indication information element is used to indicate the type of the gateway resetting.

With reference to the first aspect of the present application, the first possible implementation manner of the first aspect, or the second possible implementation manner of the first aspect, in a third possible implementation manner, if the type of the gateway resetting is resetting of a serving gateway, the detecting whether gateway resetting occurs includes: detecting, by using path detection, a restart counter, or an error indication message, whether the serving gateway is reset.

A second aspect of the present application provides a network connection re-establishment method, including:

receiving a network connection re-establishment trigger message sent by a data gateway, where sending of the network connection re-establishment trigger message is triggered when the data gateway detects that gateway resetting occurs and receives a downlink packet delivered by a packet data network;

determining that a type of the gateway resetting is resetting of a data gateway or resetting of a serving gateway; and re-establishing, according to the type of the gateway resetting, a network connection corresponding to the downlink packet.

In a first possible implementation manner of the second aspect, if the type of the gateway resetting is resetting of a data gateway, the network connection re-establishment trigger message includes a user equipment Internet Protocol address;

or, if the type of the gateway resetting is resetting of a serving gateway, the network connection re-establishment trigger message includes a user identifier and a bearer identifier that are corresponding to the downlink packet.

With reference to the first possible implementation manner of the second aspect, in a second possible implementation manner, the network connection re-establishment trigger message includes a gateway resetting type indication information element, and the gateway resetting type indication information element is used to indicate the type of the gateway resetting.

With reference to the second possible implementation manner of the second aspect, in a third possible implementation manner, the determining that a type of the gateway resetting is resetting of a data gateway or resetting of a serving gateway includes:

if the network connection re-establishment trigger message includes the user equipment Internet Protocol address, determining that the type of the gateway resetting is resetting of a data gateway, or if the network connection re-establishment trigger message includes the user identifier and the bearer identifier that are corresponding to the downlink packet, determining that the type of the gateway resetting is resetting of a serving gateway; or determining, according to the type of the gateway resetting that is indicated by the gateway resetting type indication information element, that the type of the gateway resetting is resetting of a data gateway or resetting of a serving gateway.

With reference to the first possible implementation manner of the second aspect, in a fourth possible implementation manner, the re-establishing, according to the type of the gateway resetting, a network connection corresponding to the downlink packet includes:

if the type of the gateway resetting is resetting of a data gateway, querying, by using the user equipment Internet Protocol address, locally stored user information corresponding to the downlink packet; and determining, by using the user information, that a data gateway and a serving gateway that carry the network connection corresponding to the downlink packet are integrated or independently deployed, where if the data gateway and the serving gateway that carry the network connection corresponding to the downlink packet are integrated, and the serving gateway carries multiple network connections of the user equipment, all data gateways corresponding to the multiple network connections are data gateways integrated with the serving gateway, or data gateways corresponding to the multiple network connections include a data gateway integrated with the serving gateway and a data gateway deployed independently from the serving gateway;

if the data gateway and the serving gateway that carry the network connection corresponding to the downlink packet are integrated, when the user equipment has only one network connection or all data gateways corresponding to the multiple network connections are data gateways integrated with the serving gateway, selecting a new serving gateway and a new data gateway, and re-establishing, on the new serving gateway and the new data gateway, the network connection corresponding to the downlink packet; or when data gateways corresponding to the multiple network connections include a data gateway integrated with the serving gateway and a data gateway deployed independently from the serving gateway, selecting a new serving gateway and a new data gateway, and re-establishing, on the new serving gateway and the new data gateway, the network connection corresponding to the downlink packet, and re-establishing, on the new serving gateway, and updating, on the independently deployed data gateway, the network connection in the multiple network connections that is carried by the serving gateway and the independently deployed data gateway; or if the data gateway and the serving gateway that carry the network connection corresponding to the downlink packet are independently deployed, when the user equipment has only one network connection, initiating a detach procedure or a packet data network PDN connection deletion procedure to re-establish the network connection that is corresponding to the downlink packet and carried by the data gateway, or when the user equipment has multiple network connections, initiating a PDN connection deletion procedure to re-establish the network connection that is corresponding to the downlink packet and carried by the data gateway;

or, if the type of the gateway resetting is resetting of a serving gateway, querying, by using the user identifier and the bearer identifier, user information corresponding to the downlink packet; and initiating a serving gateway switching procedure to re-establish a network connection of the user equipment.

With reference to the fourth possible implementation manner of the second aspect, in a fifth possible implementation manner, the user information is UE context information, PDP context information, or PDN connection information.

With reference to the fourth or the fifth possible implementation manner of the second aspect, in a sixth possible implementation manner, if the type of the gateway resetting is resetting of a data gateway, before the step of the querying, by using the user equipment Internet Protocol address, locally stored user information corresponding to the downlink packet, the method further includes:

receiving a bearer update request message forwarded by the serving gateway, where the bearer update request message includes the Internet Protocol address allocated to the user equipment, and the bearer update request message is sent to the serving gateway when the data gateway allocates the Internet Protocol address of the user equipment by using the Dynamic Host Configuration Protocol; and storing the Internet Protocol address into the user information.

A third aspect of the present application provides a data gateway device, including:

a detecting module, configured to detect whether gateway resetting occurs; and a message delivering module, configured to: when the detecting module detects gateway resetting and receives a downlink packet sent by a packet data network, send a network connection re-establishment trigger message to an access node, where the access node determines a type of the gateway resetting and re-establishes, according to the type of the gateway resetting, a network connection corresponding to the downlink packet, and the type of the gateway resetting is resetting of a data gateway or resetting of a serving gateway.

In a first possible implementation manner of the third aspect, if the type of the gateway resetting is resetting of a data gateway, the network connection re-establishment trigger message includes a user equipment Internet Protocol address, where the user equipment Internet Protocol address is extracted from the downlink packet by the message delivering module; or if the type of the gateway resetting is resetting of a serving gateway, the network connection re-establishment trigger message includes a user identifier and a bearer identifier that are corresponding to the downlink packet, where the user identifier and the bearer identifier that are corresponding to the downlink packet are obtained by the message delivering module by querying locally stored UE context information.

With reference to the first possible implementation manner of the third aspect, in a second possible implementation manner, the network connection re-establishment trigger message includes a gateway resetting type indication information element, and the gateway resetting type indication information element is used to indicate the type of the gateway resetting.

With reference to the third aspect of the present application, the first possible implementation manner of the third aspect, or the second possible implementation manner of the third aspect, in a third possible implementation manner, the detecting module is specifically configured to: detect, by using path detection, a restart counter, or an error indication message, whether the serving gateway is reset.

A fourth aspect of the present application provides an access node device, including:

a message receiving module, configured to receive a network connection re-establishment trigger message sent by a data gateway, where sending of the network connection re-establishment trigger message is triggered when the data gateway detects gateway resetting and receives a downlink packet delivered by a packet data network;

a determining module, configured to determine that a type of the gateway resetting is resetting of a data gateway or resetting of a serving gateway; and a network connection re-establishing module, configured to re-establish, according to the type of the gateway resetting that is determined by the determining module, a network connection corresponding to the downlink packet.

In a first possible implementation manner of the fourth aspect, if the type of the gateway resetting is resetting of a data gateway, the network connection re-establishment trigger message includes a user equipment Internet Protocol address included in the downlink packet; or if the type of the gateway resetting is resetting of a serving gateway, the network connection re-establishment trigger message includes a user identifier and a bearer identifier that are corresponding to the downlink packet.

With reference to the first possible implementation manner of the fourth aspect, in a second possible implementation manner, the network connection re-establishment trigger message includes a gateway resetting type indication information element, and the gateway resetting type indication information element is used to indicate the type of the gateway resetting.

With reference to the second possible implementation manner of the fourth aspect, in a third possible implementation manner, the determining module is specifically configured to:

if the network connection re-establishment trigger message includes the user equipment Internet Protocol address, determine that the type of the gateway resetting is resetting of a data gateway, or if the network connection re-establishment trigger message includes the user identifier and the bearer identifier that are corresponding to the downlink packet, determine that the type of the gateway resetting is resetting of a serving gateway; or determine, according to the type of the gateway resetting that is indicated by the gateway resetting type indication information element, that the type of the gateway resetting is resetting of a data gateway or resetting of a serving gateway.

With reference to the first possible implementation manner of the fourth aspect, in a fourth possible implementation manner, the network connection re-establishing module includes a querying subunit, a determining subunit, and a first network connection re-establishing subunit, where:

when the type of the gateway resetting is resetting of a data gateway, the querying subunit is configured to query, by using the user equipment Internet Protocol address, locally stored user information corresponding to the downlink packet;

the determining subunit is configured to determine, by using the user information found by the querying subunit, that a data gateway and a serving gateway that carry the network connection corresponding to the downlink packet are integrated or independently deployed, where if the data gateway and the serving gateway that carry the network connection corresponding to the downlink packet are integrated, and the serving gateway carries multiple network connections of the user equipment, all data gateways corresponding to the multiple network connections are data gateways integrated with the serving gateway, or data gateways corresponding to the multiple network connections include a data gateway integrated with the serving gateway and a data gateway deployed independently from the serving gateway; and the first network connection re-establishing subunit is configured to: when the determining subunit determines that the data gateway and the serving gateway that are of the network connection corresponding to the downlink packet are integrated, and the user equipment has only one network connection or all data gateways corresponding to the multiple network connections are data gateways integrated with the serving gateway, select a new serving gateway and a new data gateway, and re-establish, on the new serving gateway and the new data gateway, the network connection corresponding to the downlink packet; or when the determining subunit determines that the data gateway and the serving gateway that are of the network connection corresponding to the downlink packet are integrated, and data gateways corresponding to the multiple network connections include a data gateway integrated with the serving gateway and a data gateway deployed independently from the serving gateway, select a new serving gateway and a new data gateway, and re-establish, on the new serving gateway and the new data gateway, the network connection corresponding to the downlink packet, and re-establish, on the new serving gateway, and update, on the independently deployed data gateway, the network connection in the multiple network connections that is carried by the serving gateway and the independently deployed data gateway; or the first network connection re-establishing subunit is configured to: when the determining subunit determines that the data gateway and the serving gateway that are of the network connection corresponding to the downlink packet are independently deployed, and when the user equipment has only one network connection, initiate a detach procedure or a packet data network PDN connection deletion procedure to re-establish the network connection that is corresponding to the downlink packet and carried by the data gateway, or when the user equipment has multiple network connections, initiate a PDN connection deletion procedure to re-establish the network connection that is corresponding to the downlink packet and carried by the data gateway; or the network connection re-establishing module includes a querying subunit and a second network connection re-establishing subunit, where:

when the type of the gateway resetting is resetting of a serving gateway, the querying subunit is configured to query, by using the user identifier and the bearer identifier, user information corresponding to the downlink packet; and the second network connection re-establishing subunit is configured to initiate a serving gateway switching procedure to re-establish a network connection corresponding to the user equipment.

With reference to the fourth possible implementation manner of the fourth aspect, in a fifth possible implementation manner, the user information is UE context information, PDP context information, or PDN connection information.

With reference to the fourth or the fifth possible implementation manner of the fourth aspect, in a sixth possible implementation manner, the device further includes:

a second message receiving module, configured to receive a bearer update request message forwarded by the serving gateway, where the bearer update request message includes the Internet Protocol address allocated to the user equipment, and the bearer update request message is sent to the serving gateway when the data gateway allocates the Internet Protocol address of the user equipment by using the Dynamic Host Configuration Protocol; and a storage module, configured to store the Internet Protocol address received by the second message receiving module into a base of the UE context information.

A fifth aspect of the present invention provides a network connection re-establishment system, including a data gateway device and an access node device, where:

the data gateway device is configured to: when it is detected that gateway resetting occurs, and a downlink packet sent by a packet data network is received, send a network connection re-establishment trigger message to the access node device, where a type of the gateway resetting is resetting of a data gateway or resetting of a serving gateway; and the access node device is configured to receive the network connection re-establishment trigger message sent by the data gateway device, determine a type of the gateway resetting, and re-establish, according to the type of the gateway resetting, a network connection corresponding to the downlink packet.

In a first possible implementation manner of the fifth aspect, if the type of the gateway resetting is resetting of a data gateway, the network connection re-establishment trigger message includes a user equipment Internet Protocol address included in the downlink packet; or if the type of the gateway resetting is resetting of a serving gateway, the network connection re-establishment trigger message includes a user identifier and a bearer identifier that are corresponding to the downlink packet.

With reference to the first possible implementation manner of the fifth aspect, in a second possible implementation manner, the network connection re-establishment trigger message includes a gateway resetting type indication information element, and the gateway resetting type indication information element is used to indicate the type of the gateway resetting.

With reference to the first possible implementation manner of the fifth aspect, in a third possible implementation manner, if the type of the gateway resetting is resetting of a serving gateway, the data gateway device detects, by using path detection, a restart counter, or an error indication message, whether the serving gateway is reset.

In the present invention, after gateway resetting that includes resetting of a data gateway and resetting of a serving gateway occurs, a data gateway is triggered by a downlink packet to send a network connection re-establishment trigger message to an access node, and the access node re-establishes a network connection. In the present invention, re-establishing of the network connection after the gateway resetting is triggered in real time by the downlink packet, which can quickly re-establish the network connection, and can be applied to a situation in which a serving gateway and the data gateway are integrated.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
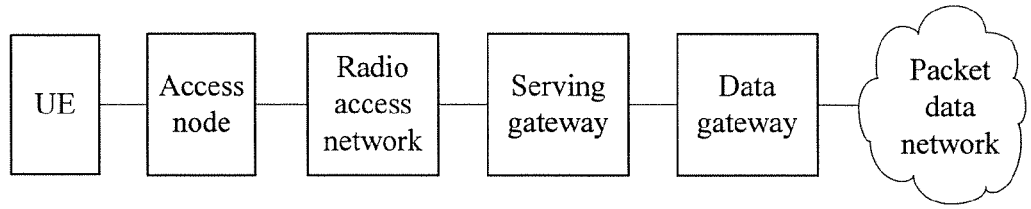
FIG. 1 is a logical architecture diagram of an EPS mobile communications network.

As shown in FIG. 1, FIG. 1 is a logical architecture diagram of an EPS mobile communications network. A UE accesses the mobile communications network by using a local radio access network. An access node is a convergence point of an access network and is responsible for functions such as location management, connection management, security authentication, and gateway selection of a mobile user equipment. A serving gateway is a local access gateway of the user equipment and is responsible for connection management and data forwarding that are related to an access technology. A data gateway is a gateway for the user equipment to access an external data network, is responsible for data connection management and data forwarding when a user accesses a packet data network, and also provides an anchor of a mobile service for a mobile user. Logical functions of the serving gateway and the data gateway may be implemented by using an integrated physical node.

The foregoing logical architecture diagram is corresponding to an actual network, which may be an EPS network for 3rd Generation Partnership Project (3GPP) access. The radio access network may be specifically various radio technology access networks, such as a universal terrestrial radio access network (UTRAN), a GSM/EDGE radio access network (GERAN), and an evolved universal terrestrial radio access network (E-UTRAN). The access node may be a mobility management entity (MME) or a serving GPRS support node (SGSN). The serving gateway may be a serving gateway (SGW), and the data gateway may be a packet data network gateway (PGW). An interface protocol between the access node and the serving gateway and between the serving gateway and the data gateway is a general packet radio service (GPRS) tunneling protocol (GTP).

Figure 2:
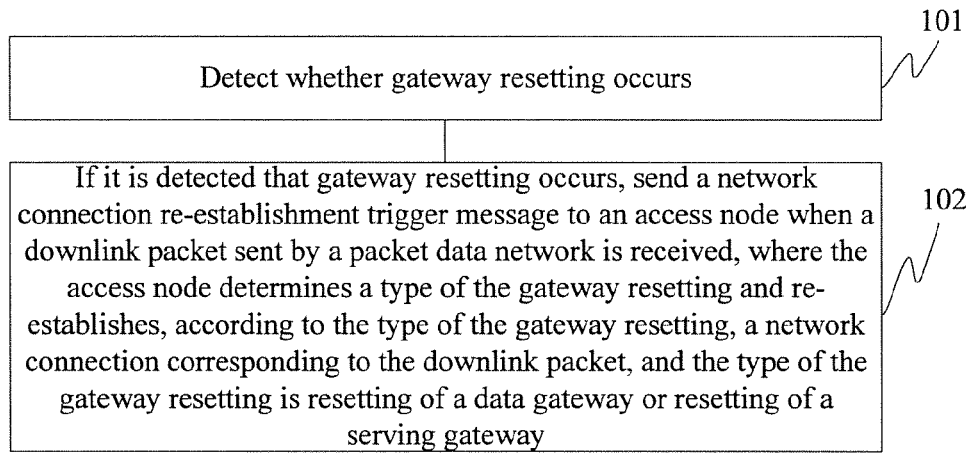
FIG. 2 is a flowchart of a network connection re-establishment method according to an embodiment of the present invention.

Referring to FIG. 2, FIG. 2 is a flowchart of a network connection re-establishment method according to an embodiment of the present invention. The embodiment of the present invention is executed by a data gateway. As shown in FIG. 2, the network connection re-establishment method provided in this embodiment includes:

101. Detect whether gateway resetting occurs.

102. If it is detected that gateway resetting occurs, send a network connection re-establishment trigger message to an access node when a downlink packet sent by a packet data network is received, where the access node determines a type of the gateway resetting and re-establishes, according to the type of the gateway resetting, a network connection corresponding to the downlink packet, and the type of the gateway resetting is resetting of the data gateway or resetting of a serving gateway.

Information about the access node may be configured on the data gateway, or may be obtained from another node, such as a policy and charging rules function (PCRF) or a home subscriber server (HSS), which is not limited herein. The data gateway may obtain the information about the access node from the PCRF or the HSS, to select an access node and send a network connection re-establishment trigger message to the access node. The network connection re-establishment trigger message may be an existing message, or may be a new message.

Optionally, if the type of the gateway resetting is resetting of a data gateway, the network connection re-establishment trigger message includes a user equipment Internet Protocol (UE Internet Protocol, UE IP) address, where the UE IP address is extracted from the downlink packet; or if the type of the gateway resetting is resetting of a serving gateway, the network connection re-establishment trigger message includes a user identifier and a bearer identifier (EPS bearer Identifier, EBI) that are corresponding to the downlink packet, where the user identifier and the EBI that are corresponding to the downlink packet are obtained by querying locally stored user information.

Optionally, the network connection re-establishment trigger message may further include a gateway resetting type indication information element, and the gateway resetting type indication information element is used to indicate the type of the gateway resetting.

This embodiment is executed by the data gateway, and "locally" in the foregoing locally stored user information indicates that the user information is stored in the data gateway or another network node that can be read by the data gateway.

The user identifier may be information such as an international mobile subscriber identification number (IIMSI), a mobile subscriber international ISDN/PSTN number (MSISDN), or an international mobile equipment identity (IMEI).

Because this embodiment is executed by the data gateway, if the type of the gateway resetting is resetting of a data gateway, a method of detecting whether gateway resetting occurs may be: querying resetting information stored in a permanent register, or the like.

Optionally, if the type of the gateway resetting is resetting of a serving gateway, the method of detecting whether gateway resetting occurs may be:

detecting, by using path detection, a restart counter, or an error indication message, whether the serving gateway is reset.

A specific process of detecting, by using path detection, whether the serving gateway is reset is as follows:

The data gateway sends an echo request message to the serving gateway, and if the serving gateway does not reply with an echo response message within a specified time, the data gateway re-sends an echo request message. After the data gateway re-sends an echo request for a specified quantity of times, if the serving gateway still does not reply with an echo response message, the data gateway learns that the serving gateway is reset.

A specific process of detecting, by using a restart counter, whether the serving gateway is reset is as follows:

A GTP entity maintains the restart counter, and sends the restart counter to a peer end by using an echo request message, an echo response message, or a GTP control plane (GTP-C) signaling message, where a value carried by a recovery information element in these messages is a value of the restart counter. The peer end saves the restart counter sent by the GTP entity. A GTP is a communications protocol widely used between network elements of a GPRS network, such as a serving support node (SGSN) and a gateway GPRS support node (GGSN). In this embodiment, the data gateway detects whether resetting occurs on the serving gateway; therefore, the GTP entity herein is the serving gateway, and the peer end is the data gateway.

After being reset and restarted, the GTP entity increases the value of the restart counter, and notifies the peer end of a changed restart counter. The GTP entity may actively notify the peer end of the restart counter by using an echo request or a GTP-C request message, or may notify the peer end of the restart counter by using a corresponding response message for a detection message (Echo Request) or a GTP-C request message sent by the peer end. After receiving the restart counter, the peer end compares the restart counter with the restart counter that is previously sent by the GTP entity and saved. If a value of the received restart counter is greater than a value of the previously stored restart counter, it indicates that the GTP entity that sends the restart counter is restarted, and the peer end saves the newly received restart counter, and deletes or invalids a UE context related to the reset GTP entity, such as a PDN context or a PDP context.

A specific method of detecting, by using an Error indication, whether the serving gateway is reset is as follows:

The data gateway sends the downlink packet to the serving gateway, and the serving gateway sends the Error Indication message to the data gateway because the serving gateway cannot find user equipment information corresponding to the downlink packet, so that the data gateway learns that an exception occurs on the serving gateway.

In this embodiment, after gateway resetting that includes resetting of a data gateway and resetting of a serving gateway occurs, when receiving a downlink packet, a data gateway sends a network connection re-establishment trigger message to an access node, and the access node re-establishes a network connection. In this embodiment, re-establishing of the network connection after the gateway resetting is triggered in real time by the downlink packet, which can quickly re-establish the network connection, and can be applied to a situation in which a serving gateway and the data gateway are integrated.

Figure 3:
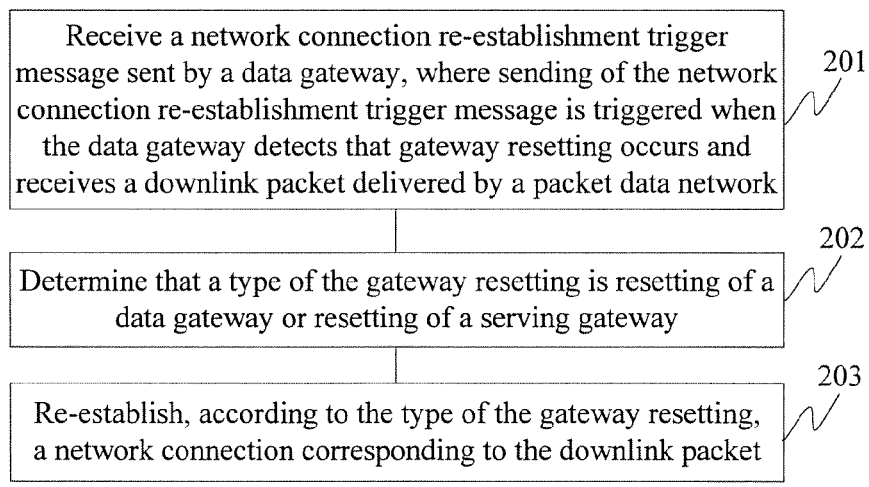
FIG. 3 is a flowchart of a network connection re-establishment method according to an embodiment of the present invention.

Referring to FIG. 3, FIG. 3 is a flowchart of a network connection re-establishment method according to an embodiment of the present invention. The embodiment of the present invention is executed by an access node. As shown in FIG. 3, the network connection re-establishment method provided in this embodiment includes:

201. Receive a network connection re-establishment trigger message sent by a data gateway, where sending of the network connection re-establishment trigger message is triggered when the data gateway detects that gateway resetting occurs and receives a downlink packet delivered by a packet data network.

202. Determine that a type of the gateway resetting is resetting of a data gateway or resetting of a serving gateway.

203. Re-establish, according to the type of the gateway resetting, a network connection corresponding to the downlink packet.

Optionally, if the type of the gateway resetting is resetting of a data gateway, the network connection re-establishment trigger message includes a user equipment Internet Protocol address; or if the type of the gateway resetting is resetting of a serving gateway, the network connection re-establishment trigger message includes a user identifier and a bearer identifier that are corresponding to the downlink packet.

Optionally, the network connection re-establishment trigger message may further include a gateway resetting type indication information element, and the gateway resetting type indication information element is used to indicate the type of the gateway resetting.

Optionally, a specific method of determining that the type of the gateway resetting is resetting of a data gateway or resetting of a serving gateway may be:

if the network connection re-establishment trigger message includes the user equipment Internet Protocol address, determining that the type of the gateway resetting is resetting of a data gateway, or if the network connection re-establishment trigger message includes the user identifier and the bearer identifier that are corresponding to the downlink packet, determining that the type of the gateway resetting is resetting of a serving gateway; or directly determining, according to the type of the gateway resetting that is indicated by the gateway resetting type indication information element, that the type of the gateway resetting is resetting of a data gateway or resetting of a serving gateway.

Optionally, a specific method of re-establishing, according to the type of the gateway resetting, the network connection corresponding to the downlink packet may be:

if the type of the gateway resetting is resetting of a data gateway, querying, by using the user equipment Internet Protocol address, locally stored user information corresponding to the downlink packet; and determining, by using the user information, that a data gateway and a serving gateway that carry the network connection corresponding to the downlink packet are integrated or independently deployed, where if the data gateway and the serving gateway that carry the network connection corresponding to the downlink packet are integrated, and the serving gateway carries multiple network connections of the user equipment, all data gateways corresponding to the multiple network connections are data gateways integrated with the serving gateway, or data gateways corresponding to the multiple network connections include a data gateway integrated with the serving gateway and a data gateway deployed independently from the serving gateway;

if the data gateway and the serving gateway that carry the network connection corresponding to the downlink packet are integrated, when the user equipment has only one network connection or all data gateways corresponding to the multiple network connections are data gateways integrated with the serving gateway, selecting a new serving gateway and a new data gateway, and re-establishing, on the new serving gateway and the new data gateway, the network connection corresponding to the downlink packet; or when data gateways corresponding to the multiple network connections include a data gateway integrated with the serving gateway and a data gateway deployed independently from the serving gateway, selecting a new serving gateway and a new data gateway, and re-establishing, on the new serving gateway and the new data gateway, the network connection corresponding to the downlink packet, and re-establishing, on the new serving gateway, and updating, on the independently deployed data gateway, the network connection in the foregoing multiple network connections that is carried by the serving gateway and the independently deployed data gateway; or if the data gateway and the serving gateway that carry the network connection corresponding to the downlink packet are independently deployed, when the user equipment has only one network connection, initiating a detach procedure or a packet data network PDN connection deletion procedure to re-establish the network connection that is corresponding to the downlink packet and carried by the data gateway, or when the user equipment has multiple network connections, initiating a PDN connection deletion procedure to re-establish the network connection that is corresponding to the downlink packet and carried by the data gateway;

or, if the type of the gateway resetting is resetting of a serving gateway, querying, by using the user identifier and the bearer identifier, user information corresponding to the downlink packet; and initiating a serving gateway switching procedure to re-establish a network connection of the user equipment;

where: if the UE has only one network connection, when the access node is an MME, the detach procedure is initiated to re-establish the network connection;

if the UE has only one network connection, when the access node is an SGSN, the PDN connection deletion procedure is initiated to re-establish the network connection; or if the UE has multiple network connections, when the access node is either an SGSN or an MME, the PDN connection deletion procedure is initiated to re-establish the network connection.

The foregoing network connection refers to a connection that is established between the user equipment and the packet data network and identified by the user equipment Internet Protocol address and an access point name identifier of the packet data network.

The foregoing new serving gateway and the foregoing new data gateway may be a serving gateway and a data gateway that are reset and restarted, or may be nodes different from the reset serving gateway and the reset data gateway.

Optionally, the foregoing user information is UE context information, PDP context information, or PDN connection information.

Optionally, if the type of the gateway resetting is resetting of a data gateway, before the foregoing step of the querying, by using the user equipment Internet Protocol address, locally stored user information corresponding to the downlink packet, the method provided in this embodiment may further include:

receiving a bearer update request message forwarded by the serving gateway, where the bearer update request message includes the Internet Protocol address allocated to the user equipment, and the bearer update request message is sent to the serving gateway when the data gateway allocates the Internet Protocol address of the user equipment by using the Dynamic Host Configuration Protocol (DHCP); and storing the Internet Protocol address into the user information.

A base of the foregoing locally stored user information refers to a base of user information that is locally stored in the access node or stored in another network node that can be read by the access node. The base of the user information herein includes user information of the user equipment corresponding to the access node.

In this embodiment, when receiving a network connection re-establishment trigger message sent by a data gateway, an access node initiates a network connection re-establishment procedure according to a type of gateway resetting, to quickly re-establish a network connection, where sending of the network connection re-establishment trigger message by the data gateway is triggered in real time by a downlink packet. Therefore, the access node can quickly initiate a network connection re-establishment procedure, and the method provided in this embodiment can be applied to re-establishing a network connection after an integrated gateway is reset.

Figure 4:
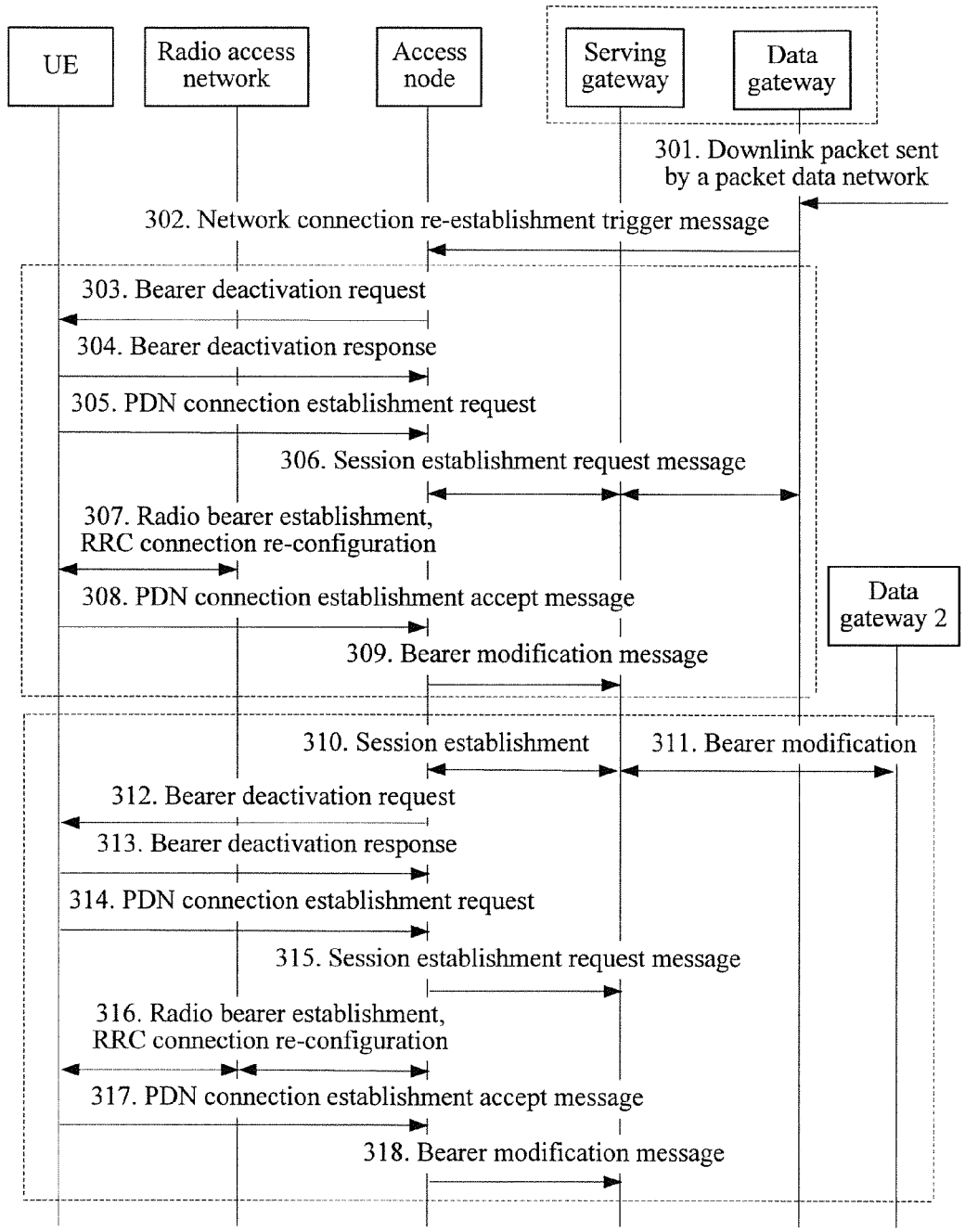
FIG. 4 is a flowchart of re-establishing a network connection after a data gateway is reset according to an embodiment.

Referring to FIG. 4, FIG. 4 is a flowchart of re-establishing a network connection after a data gateway is reset according to an embodiment. User information includes UE context information, PDN connection information, and PDP context information. An example in which the user information is PDN connection information is used for description in this embodiment, and a network connection in this embodiment that is corresponding to PDN connection information is a PDN connection. As shown in FIG. 4, a PDN connection re-establishment method provided in this embodiment includes:

301. A data gateway receives a downlink packet sent by a packet data network to a UE.

302. The data gateway acquires a UE IP address included in the downlink packet, and sends a network connection re-establishment trigger message to an access node.

After receiving the network connection re-establishment trigger message, the access node queries locally stored user information according to the UE IP address in the network connection re-establishment trigger message, and finds PDN connection information corresponding to the UE. The access node determines, according to information about a serving gateway and the data gateway in the PDN connection information, whether an integrated node in which the serving gateway and the data gateway are integrated is selected for the PDN connection, or an independent serving gateway and an independent data gateway are selected for the PDN connection when the serving gateway and the data gateway are independently deployed. Specifically, determining may be performed according to the information about the serving gateway and the data gateway, such as IP addresses of the serving gateway and the data gateway and fully qualified domain names (FQDN) of the serving gateway and the data gateway. If an independent data gateway is selected, steps 303 to 309 are performed; if the data gateway is an integrated node, steps 310 to 318 are performed.

303. If in all PDN connections of the UE, only some of the PDN connections need to be recovered, the access node initiates a PDN connection deactivation procedure to PDN connections that need to be recovered. The access node sends a bearer deactivation request message to the UE, where the message carries a cause value of a re-activation request.

304. The UE replies to the access node with a bearer deactivation response message.

305. The UE initiates a PDN connection establishment request to the access node, to re-establish a deactivated PDN connection.

306. The access node selects a new data gateway, where the new data gateway may be a reset data gateway, or may be another data gateway, and the access node selects the new data gateway according to an access point name. After selecting the data gateway, the access node sends a session establishment request message to the serving gateway, where the message includes information such as an IP address of the newly selected data gateway. The serving gateway establishes a session with the data gateway and replies to the access node with a session establishment response message.

307. The access node establishes a radio bearer with a radio access network, and the radio access network performs radio resource control (RRC for short) connection re-configuration with the UE.

308. The UE replies to the access node with a PDN connection establishment accept message.

309. The access node sends a bearer modification request message to the serving gateway, where the message includes user plane information allocated by an access network, which is used to establish a downlink user plane tunnel of the PDN connection.

If in all the PDN connections of the UE, all the PDN connections need to be recovered, step 303 to step 308 are replaced by the following step 303a to step 308a:

303a. The access node initiates a detach procedure and sends a detach request message to the UE, where the detach message carries a cause value of a re-attach request.

304a. The UE replies to the access node with a detach response message.

305a. The UE sends an attach request message to the access node.

306a. The access node selects a new serving gateway and a new data gateway, where a session is established between the new serving gateway and the new data gateway. The access node re-selects a serving gateway according to an access node location, and re-selects a data gateway according to an access point name. The new serving gateway may be an original serving gateway, or may be another serving gateway; and the new data gateway may be a reset data gateway, or may be another data gateway.

307a. Establish a context of an initial user equipment between the access node and a radio access network, and perform RRC connection re-configuration between the radio access network and the user equipment.

308a. The UE replies to the access node with an attach accept message.

The access node in the foregoing network connection re-establishment method is an MME. When the access node is an SGSN, no matter whether all PDN connections of the UE need to be recovered or some of the PDN connections need to be recovered, the SGSN only triggers a PDN connection deletion procedure. Therefore, if the access node is an SGSN, step 303 is replaced by step 303b, step 304 is replaced by step 304b, step 305 is replaced by step 305b, and step 308 is replaced by step 308b.

303b. An SGSN sends a PDP context deactivation request message to the UE, where the message carries a cause value of a re-activation request instead.

304b. The UE replies to the access node with a PDP context deactivation response message.

305b. The UE replies to the access node with a PDP context activation request message.

308b. The access node replies to the UE with a PDP context activation response message.

If the access node determines that the data gateway is an integrated node, steps 310 to 318 are performed.

310. If in all the PDN connections of the UE, only some of the PDN connections are established on a reset data gateway, the access node triggers a serving gateway switching procedure to re-select a serving gateway, and sends a session establishment request to the new serving gateway, where the session establishment request message carries information about a PDN connection established by the UE on another independent data gateway (such as data gateway 2) that is not reset. The new serving gateway may be a serving gateway that is reset and restarted with an integrated data gateway, or may be another serving gateway.

311. The new serving gateway sends a bearer modification request message to data gateway 2, and updates a PDN connection between the serving gateway and data gateway 2.

Step 312 to step 318 are a PDN connection deactivation procedure triggered by the access node, and are used to re-establish a PDN connection on the reset data gateway. The procedure is consistent with step 303 to step 309, or step 303b to step 309b of a network connection re-establishment procedure when the data gateway is an independent data gateway, and details are not described herein again.

If all the PDN connections of the UE are established on the reset data gateway, and if the access node is an MME, the detach procedure is triggered, and specific steps are described in steps 303a to 309a. If the access node is an SGSN, the PDN connection deactivation procedure is triggered. For specific steps, refer to a change of steps 303b, 304b, 305b, and 308b, and details are not described herein again.

In the foregoing processing method of re-establishing a network connection after gateway resetting, further, the access node triggers a recovery procedure for a specific PDN connection according to a local policy. After receiving the network connection re-establishment trigger message sent by the data gateway, the access node queries the locally stored corresponding PDN connection information according to the UE IP address included in the network connection re-establishment trigger message, and determines, according to information such as an allocation/retention priority (ARP), a QoS class identifier (QCI), and an access point name (access node N) in the PDN connection information, whether to trigger a subsequent recovery procedure.

Figure 5:
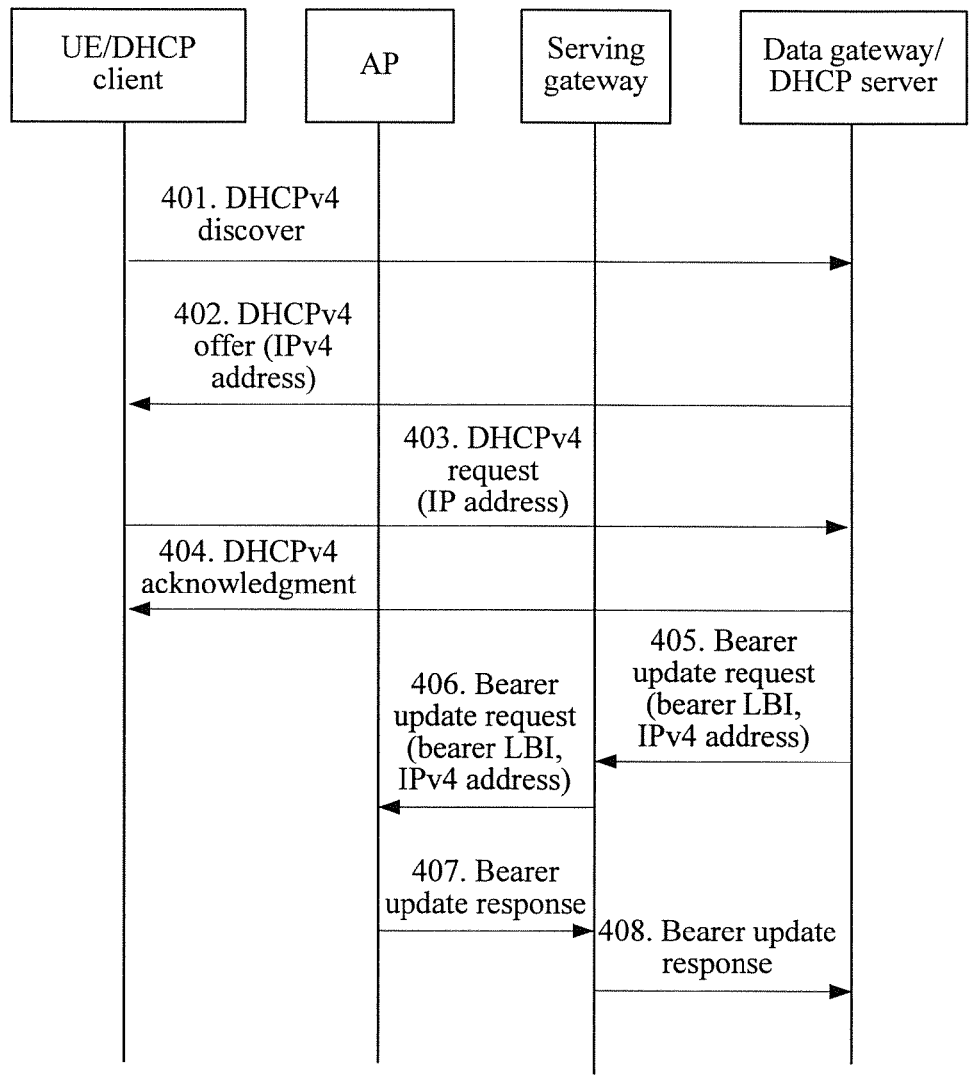
FIG. 5 is a flowchart of obtaining an IP address by an access node.

In this embodiment, an access node queries locally stored PDN connection information by using an IP address of a UE in a network connection re-establishment trigger message; therefore, the access node needs to store the IP address of the UE. IPv4 is the fourth version of the IP protocol, and also is a protocol that is first widely used and forms a cornerstone of current Internet technologies. The IPv4 protocol is used as an example in this embodiment to describe a procedure in which the access node obtains the IP address. As shown in FIG. 5, the procedure in which the access node obtains the IP address includes:

401. A UE is used as a Dynamic Host Configuration Protocol (DHCP) client and initiates a DHCPv4 procedure to acquire an IPv4 address, and the user equipment sends a DHCPv4 discover message.

402. After receiving the DHCPv4 discover message of the UE, a data gateway, used as a DHCP server, sends a DHCPv4 offer message that carries an allocated IPv4 address and another setting.

403. After receiving the DHCPv4 offer message, the UE sends a DHCP request message, where the message carries the received IPv4 address.

404. After receiving the DHCP request message, the data gateway replies with a DHCP acknowledgment (DHCP ACK) message to acknowledge the offered IPv4 address, where the message further carries some other settings.

405. The data gateway sends a bearer update request message to a serving gateway, where the message carries a linked bearer identifier (LBI) of a bearer and the IPv4 address allocated to the UE.

406. The serving gateway forwards the message to an access node.

407. After receiving the message, the access node stores the IPv4 address carried in the message, and sends a bearer update response message to the serving gateway.

408. The serving gateway forwards the bearer update response message to the data gateway.

In this embodiment, after resetting occurs on a data gateway, the data gateway directly sends a network connection re-establishment trigger message to an access node when receiving a downlink packet, and the access node initiates a network connection re-establishment procedure, which can quickly re-establish a network connection and can be applied to a situation in which a serving gateway and the data gateway are integrated.

Figure 6:
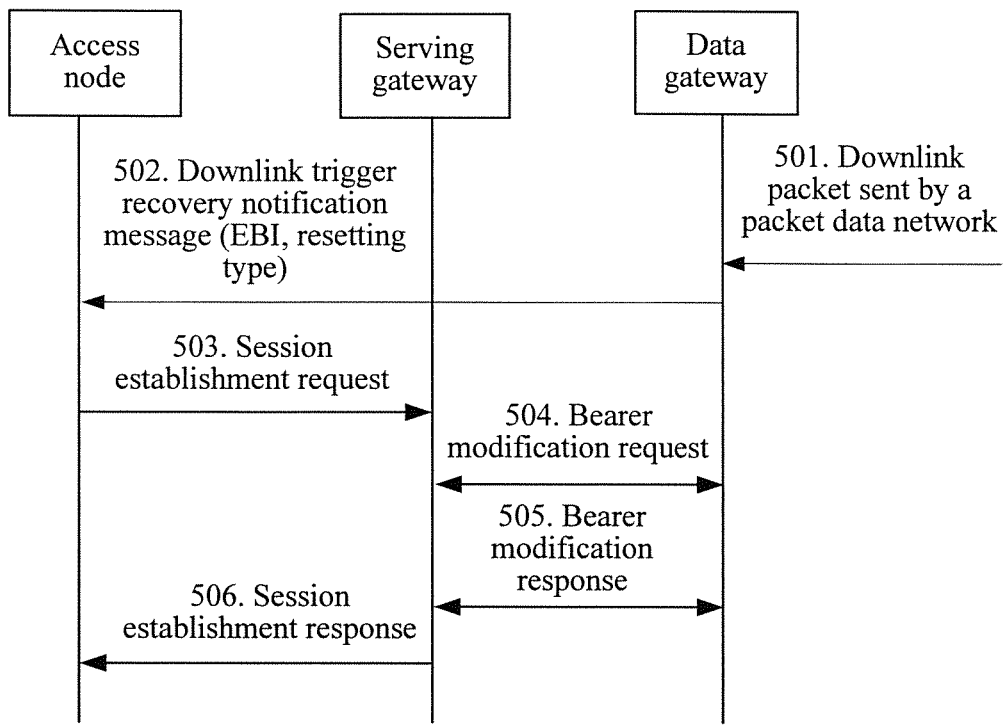
FIG. 6 is a flowchart of re-establishing a network connection after a serving gateway is reset according to an embodiment.

Referring to FIG. 6, FIG. 6 is a flowchart of re-establishing a network connection after a serving gateway is reset according to an embodiment. User information includes PDN connection information and PDP context information.

An example in which the user information is PDN connection information is used for description in this embodiment, and a network connection in this embodiment that is corresponding to PDN connection information is a PDN connection. As shown in FIG. 6, a PDN connection re-establishment method provided in this embodiment includes:

501. A data gateway detects that a serving gateway is reset, where the data gateway detects, by using the foregoing path detection, restart counter, or error indication message, whether the serving gateway is reset.

502. The data gateway obtains, by querying PDN connection information of a UE that is corresponding to a downlink packet, a user identifier corresponding to the downlink packet and an EBI corresponding to the downlink packet that are stored in the PDN connection information. The data gateway sends a network connection re-establishment trigger message to an access node, where the network connection re-establishment trigger message includes the user identifier and the EBI. The data gateway learns a corresponding access node by using an access node identifier stored in the PDN connection information corresponding to the downlink packet, and sends the foregoing network connection re-establishment trigger message to the corresponding access node; or the data gateway learns a corresponding access node according to an access node identifier that is locally configured or obtained from another node such as a PCRF and an HSS, and sends the network connection re-establishment trigger message to the corresponding access node. The network connection re-establishment trigger message may be an existing message, or may be a new message.

503. After receiving the network connection re-establishment trigger message, the access node learns, according to the user identifier and the EBI that are in the network connection re-establishment trigger message, specific PDN connection information of the UE that is corresponding to the downlink packet. The access node initiates a serving gateway switching procedure, to recover an affected PDN connection. Further, the access node determines, according to a local configuration policy, whether to initiate a PDN connection recovery procedure. For example, the access node determines, according to a QCI/ARP/access node of a bearer that is corresponding to the downlink packet, whether to initiate a recovery procedure.

The access node re-selects a serving gateway, where the new serving gateway may be a serving gateway that is reset and restarted, or may be another serving gateway. Then, the access node sends a session establishment request message to the new serving gateway, where the message includes the PDN connection information of the UE that is corresponding to the downlink packet.

504. The serving gateway sends a bearer modification request message to a data gateway corresponding to a PDN connection, where the message includes information about a signaling plane and a user plane that are of the serving gateway.

505. The data gateway replies with a bearer modification response message, and a PDN connection of the user equipment is established between the serving gateway and the data gateway.

506. The serving gateway replies to the access node with a session establishment response message, and information about the user equipment is re-established on a newly selected serving gateway.

The foregoing steps 501 to 506 are main steps in this embodiment. During specific implementation, the following branches may occur according to a state of the UE:

1. If the UE is in a connected state, the access node first releases a signaling connection to the UE and converts a state of the UE into an idle state, and then performs steps 501 to 506.

2. If the UE is initiating a service request, a tracking area update procedure in which an access node does not change, or a routing area update procedure in which an access node does not change, the access node first performs steps 501 to 506, and then performs the service request, the tracking area update procedure in which the access node does not change, or the routing area update procedure in which the access node does not change.

3. If the UE is initiating a tracking area update procedure in which an access node changes or a routing area update procedure in which an access node changes, an access node on a source side notifies an access node on a target side that a procedure of re-selecting a serving gateway needs to be performed, and the access node re-selects a serving gateway to re-establish a UE context.

4. If the UE is performing a switching procedure, the access node rejects a switching request message or a re-allocation request message and converts the UE into an idle state, and then performs steps 501 to 506.

In this embodiment, after detecting that resetting occurs on a serving gateway, a data gateway directly sends a network connection re-establishment trigger message to an access node when receiving a downlink packet, and the access node initiates a network connection re-establishment procedure, which can quickly re-establish a network connection and can be applied to a situation in which the serving gateway and the data gateway are integrated.

Figure 7:
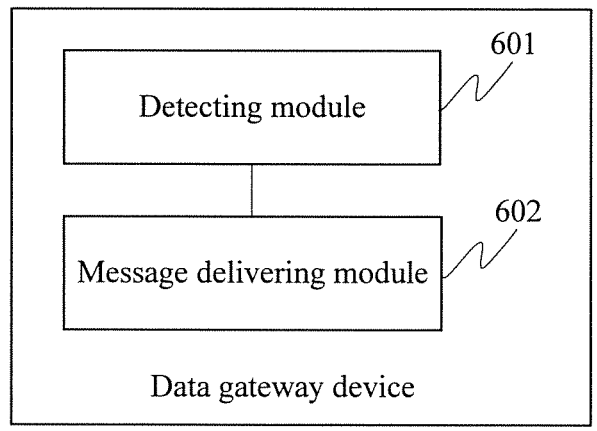
FIG. 7 is a structural diagram of a data gateway device according to an embodiment.

Referring to FIG. 7, FIG. 7 is a structural diagram of a data gateway device according to an embodiment of the present invention, where the data gateway device includes:

a detecting module 601, configured to detect whether gateway resetting occurs; and a message delivering module 602, configured to: when a downlink packet sent by a packet data network is received after the detecting module 601 detects gateway resetting, send a network connection re-establishment trigger message to an access node, where the access node determines a type of the gateway resetting and re-establishes, according to the type of the gateway resetting, a network connection corresponding to the downlink packet, and the type of the gateway resetting is resetting of a data gateway or resetting of a serving gateway.

Optionally, if the type of the gateway resetting is resetting of a data gateway, the network connection re-establishment trigger message includes a user equipment Internet Protocol address, where the user equipment Internet Protocol address is extracted from the downlink packet by the message delivering module 602;

Or, if the type of the gateway resetting is resetting of a serving gateway, the network connection re-establishment trigger message includes a user identifier and a bearer identifier that are corresponding to the downlink packet, where the user identifier and the bearer identifier that are corresponding to the downlink packet are obtained by the message delivering module 602 by querying locally stored UE context information.

Optionally, the network connection re-establishment trigger message may further include a gateway resetting type indication information element, and the gateway resetting type indication information element is used to indicate the type of the gateway resetting.

Optionally, the detecting module 601 is specifically configured to: detect, by using path detection, a restart counter, or an error indication message, whether the serving gateway is reset.

For a specific detection method, refer to the foregoing embodiment, and details are not described herein again.

After gateway resetting that includes resetting of a data gateway and resetting of a serving gateway occurs on the data gateway device provided in this embodiment, the data gateway device sends a network connection re-establishment trigger message to an access node when receiving a downlink packet, and the access node re-establishes a network connection. According to the data gateway device provided in this embodiment, re-establishing of the network connection after the gateway resetting is triggered in real time by the downlink packet, which can quickly re-establish the network connection, and can be applied to a situation in which a serving gateway and a data gateway are integrated.

Figure 8:
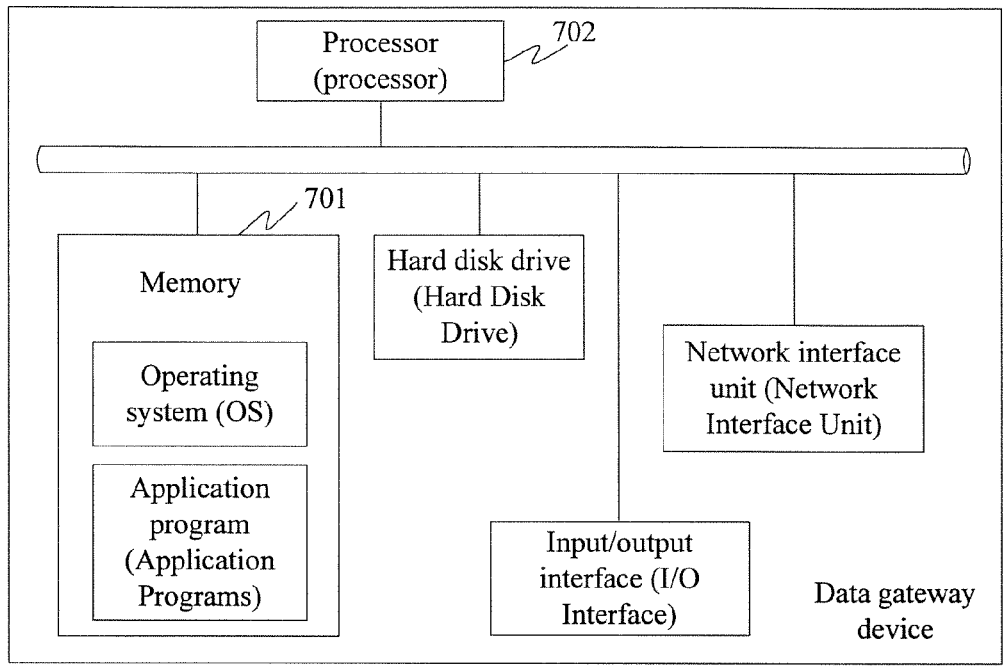
FIG. 8 is a structural diagram of another data gateway device according to an embodiment.

Referring to FIG. 8, FIG. 8 is a structural diagram of another data gateway device according to an embodiment of the present invention, where the data gateway device includes a memory 701 and a processor 702. The memory 701 is configured to store a set of program code, and the processor 702 is configured to read the program code stored in the memory 701, to perform the following operations:

detecting whether gateway resetting occurs, and if it is detected that gateway resetting occurs, sending a network connection re-establishment trigger message to an access node when a downlink packet sent by a packet data network is received, where the access node determines a type of the gateway resetting and re-establishes, according to the type of the gateway resetting, a network connection corresponding to the downlink packet, and the type of the gateway resetting is resetting of a data gateway or resetting of a serving gateway.

Optionally, if the type of the gateway resetting is resetting of a data gateway, the network connection re-establishment trigger message includes a user equipment Internet Protocol address, where the user equipment Internet Protocol address is extracted from the downlink packet by the processor 702; or if the type of the gateway resetting is resetting of a serving gateway, the network connection re-establishment trigger message includes a user identifier and a bearer identifier that are corresponding to the downlink packet, where the user identifier and the bearer identifier that are corresponding to the downlink packet are obtained by the processor 702 by querying locally stored UE context information.

Optionally, the network connection re-establishment trigger message may further include a gateway resetting type indication information element, and the gateway resetting type indication information element is used to indicate the type of the gateway resetting.

Optionally, when the type of the gateway resetting is resetting of a serving gateway, a specific manner of performing, by the processor 702, the detecting whether gateway resetting occurs includes: detecting, by using path detection, a restart counter, or an error indication message, whether the serving gateway is reset.

For a specific detection step, refer to the foregoing embodiment, and details are not described herein again.

After gateway resetting that includes resetting of a data gateway and resetting of a serving gateway occurs on the data gateway device provided in this embodiment, the data gateway device sends a network connection trigger message to an access node when receiving a downlink packet, and the access node re-establishes a network connection. According to the data gateway device provided in this embodiment, re-establishing of the network connection after the gateway resetting is triggered in real time by the downlink packet, which can quickly re-establish the network connection, and can be applied to a situation in which a serving gateway and a data gateway are integrated.

Figure 9:
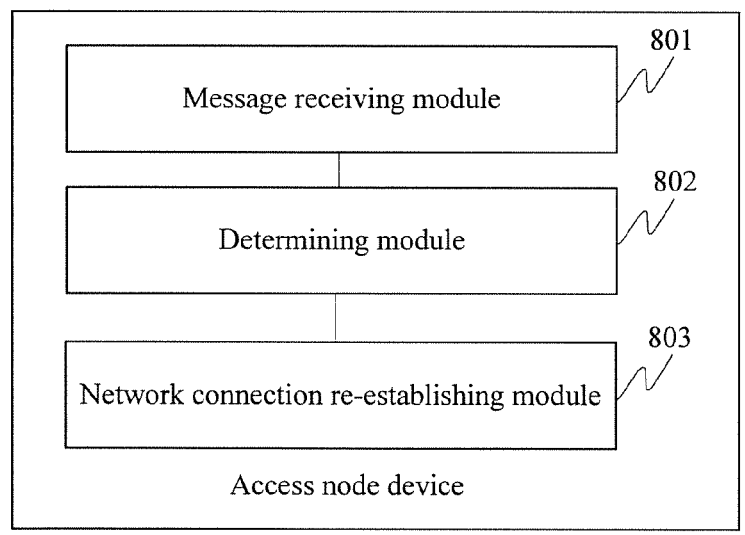
FIG. 9 is a structural diagram of an access node device according to an embodiment.

Referring to FIG. 9, FIG. 9 is a structural diagram of an access node device according to an embodiment of the present invention, where the access node device includes:

a message receiving module 801, configured to receive a network connection re-establishment trigger message sent by a data gateway, where sending of the network connection re-establishment trigger message is triggered when gateway resetting occurs and a downlink packet delivered by a packet data network is received, and a type of the gateway resetting is resetting of a data gateway or resetting of a serving gateway;

a determining module 802, configured to determine that the type of the gateway resetting is resetting of a data gateway or resetting of a serving gateway; and a network connection re-establishing module 803, configured to re-establish, according to the type of the gateway resetting that is determined by the determining module 802, a network connection corresponding to the downlink packet.

Optionally, if the type of the gateway resetting is resetting of a data gateway, the network connection re-establishment trigger message includes a user equipment Internet Protocol address included in the downlink packet; or if the type of the gateway resetting is resetting of a serving gateway, the network connection re-establishment trigger message includes a user identifier and a bearer identifier that are corresponding to the downlink packet.

Optionally, the network connection re-establishment trigger message may further include a gateway resetting type indication information element, and the gateway resetting type indication info Elation element is used to indicate the type of the gateway resetting.

Optionally, the determining module 802 is specifically configured to:

if the network connection re-establishment trigger message includes the user equipment Internet Protocol address, determine that the type of the gateway resetting is resetting of a data gateway, or if the network connection re-establishment trigger message includes the user identifier and the bearer identifier that are corresponding to the downlink packet, determine that the type of the gateway resetting is resetting of a serving gateway; or determine, according to the type of the gateway resetting that is indicated by the gateway resetting type indication information element, that the type of the gateway resetting is resetting of a data gateway or resetting of a serving gateway.

Figure 10:
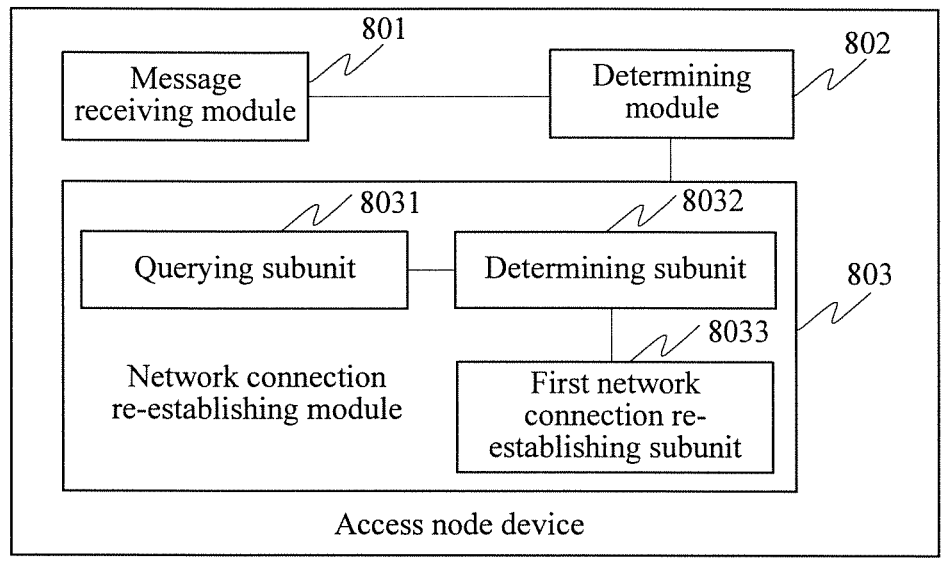
FIG. 10 is a structural diagram of another access node device according to an embodiment.
Figure 11:
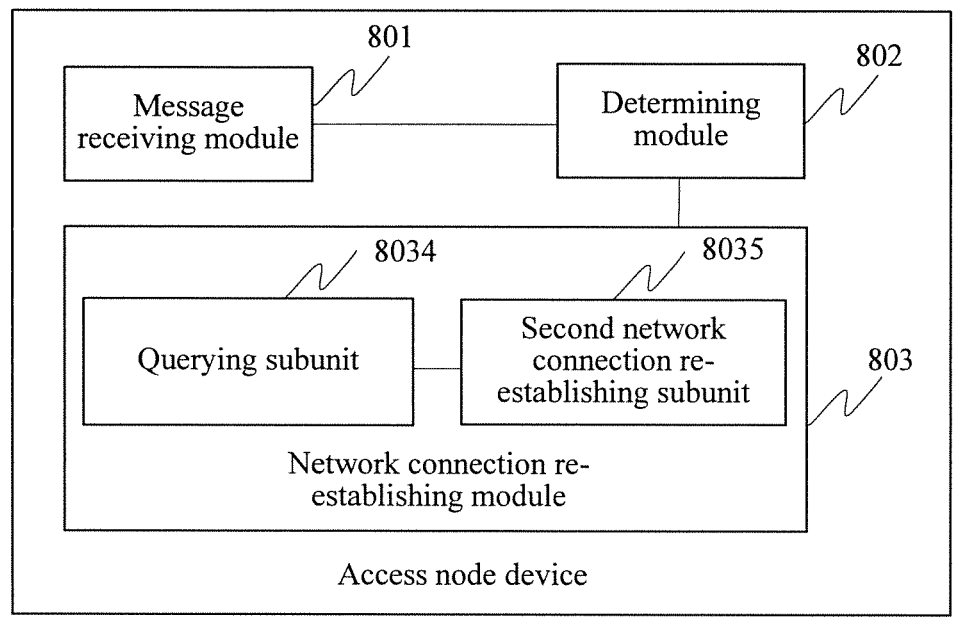
FIG. 11 is a structural diagram of still another access node device according to an embodiment.

Optionally, as shown in FIG. 10, the network connection re-establishing module 803 includes a querying subunit 8031, a determining subunit 8032, and a first network connection re-establishing subunit 8033.

When the type of the gateway resetting is resetting of a data gateway, the querying subunit 8031 is configured to query, by using the user equipment Internet Protocol address, locally stored user information corresponding to the downlink packet;

the determining subunit 8032 is configured to determine, by using the user information found by the querying subunit 8031, that a data gateway and a serving gateway that carry the network connection corresponding to the downlink packet are integrated or independently deployed, where if the data gateway and the serving gateway that carry the network connection corresponding to the downlink packet are integrated, and the serving gateway carries multiple network connections of the user equipment, all data gateways corresponding to the multiple network connections are data gateways integrated with the serving gateway, or data gateways corresponding to the multiple network connections include a data gateway integrated with the serving gateway and a data gateway deployed independently from the serving gateway; and the first network connection re-establishing subunit 8033 is configured to: when the querying subunit 8032 determines that the data gateway and the serving gateway that are of the network connection corresponding to the downlink packet are integrated, and the user equipment has only one network connection or all data gateways corresponding to the multiple network connections are data gateways integrated with the serving gateway, select a new serving gateway and a new data gateway, and re-establish, on the new serving gateway and the new data gateway, the network connection corresponding to the downlink packet; or when the querying subunit 8032 determines that the data gateway and the serving gateway that are of the network connection corresponding to the downlink packet are integrated, and data gateways corresponding to the multiple network connections include a data gateway integrated with the serving gateway and a data gateway deployed independently from the serving gateway, select a new serving gateway and a new data gateway, and re-establish, on the new serving gateway and the new data gateway, the network connection corresponding to the downlink packet, and re-establish, on the new serving gateway, and update, on the independently deployed data gateway, the network connection in the multiple network connections that is carried by the serving gateway and the independently deployed data gateway; or the first network connection re-establishing subunit 8033 is configured to: when the querying subunit 8032 determines that the data gateway and the serving gateway that are of the network connection corresponding to the downlink packet are independently deployed, and when the user equipment has only one network connection, initiate a detach procedure or a packet data network PDN connection deletion procedure to re-establish the network connection that is corresponding to the downlink packet and carried by the data gateway, or when the user equipment has multiple network connections, initiate a PDN connection deletion procedure to re-establish the network connection that is corresponding to the downlink packet and carried by the data gateway.

Alternatively, the network connection re-establishing module includes a querying subunit 8034 and a second network connection re-establishing subunit 8035.

When the type of the gateway resetting is resetting of a serving gateway, the querying subunit 8034 is configured to query, by using the user identifier and the bearer identifier, user information corresponding to the downlink packet; and the second network connection re-establishing subunit 8035 is configured to initiate a serving gateway switching procedure to re-establish a network connection corresponding to the user equipment.

The foregoing user information is UE context information, PDP context information, or PDN connection information.

Figure 12:
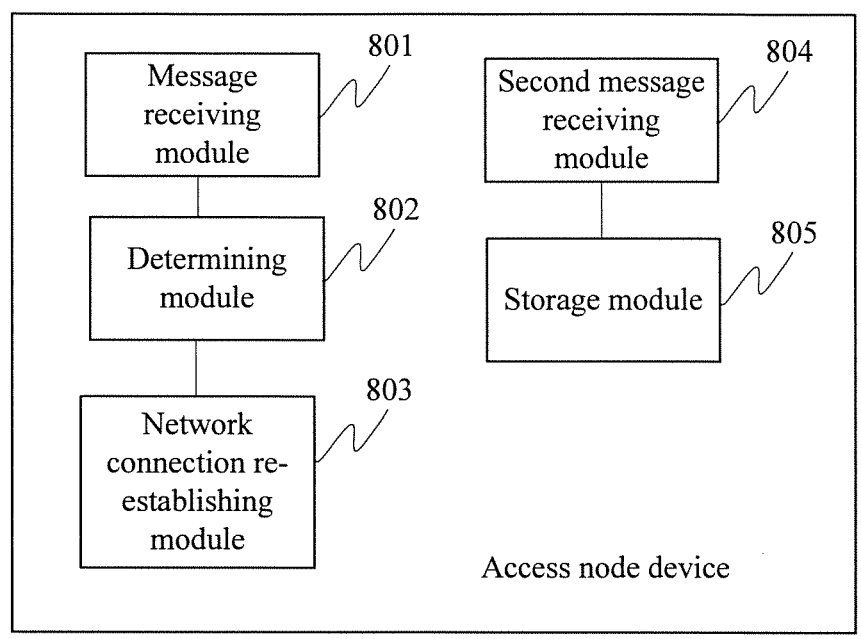
FIG. 12 is a structural diagram of yet another access node device according to an embodiment.

Optionally, as shown in FIG. 12, the access node device provided in this embodiment may further include a second message receiving module 804 and a storage module 805.

The second message receiving module 804 is configured to receive a bearer update request message forwarded by the serving gateway, where the bearer update request message includes the Internet Protocol address allocated to the user equipment, and the bearer update request message is sent to the serving gateway when the data gateway allocates the Internet Protocol address of the user equipment by using the Dynamic Host Configuration Protocol; and the storage module 805 is configured to store the Internet Protocol address received by the second message receiving module 804 into a base of the UE context information.

When receiving a network re-establishment trigger message sent by a data gateway, the access node device provided in this embodiment initiates a network connection re-establishment procedure according to a type of gateway resetting, to quickly re-establish a network connection, where sending of the network re-establishment trigger message by the data gateway is triggered in real time by a downlink packet. Therefore, the access node device can quickly initiate a network connection re-establishment procedure, and the access node device provided in this embodiment can be applied to re-establishing a network connection after an integrated gateway is reset.

Figure 13:
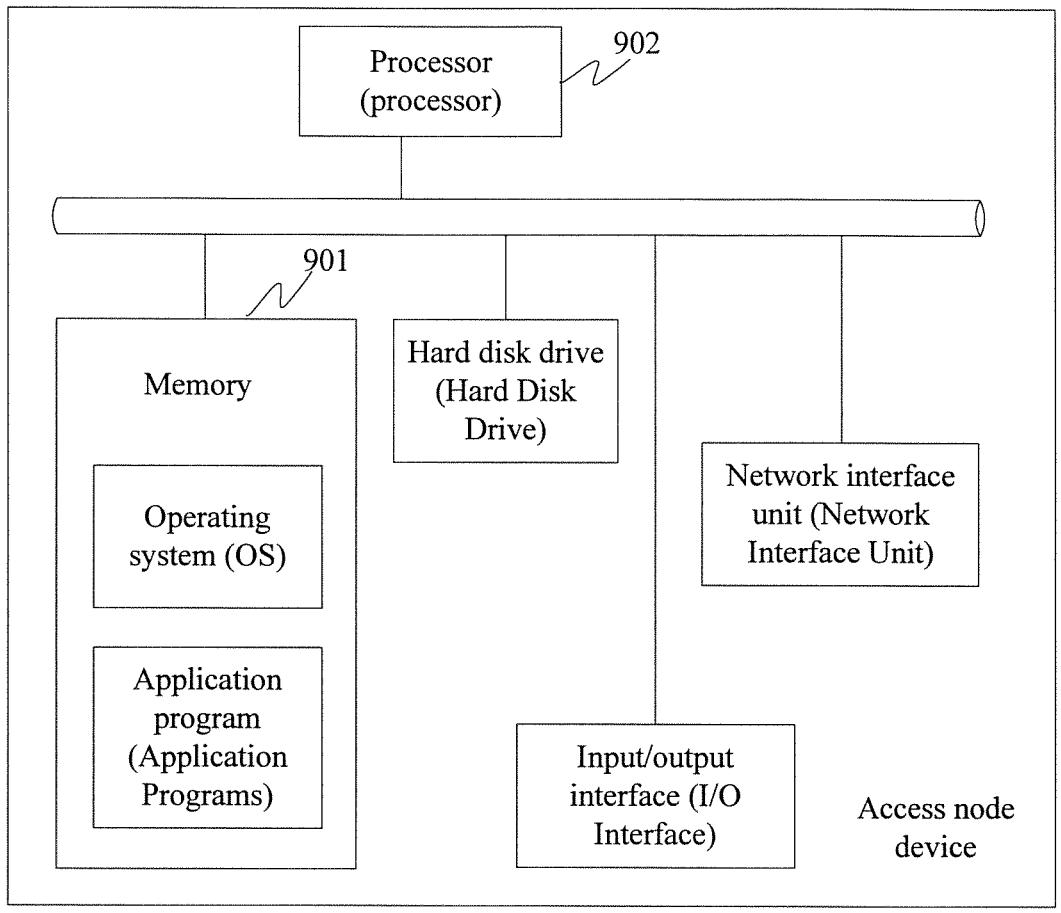
FIG. 13 is a structural diagram of still yet another access node device according to an embodiment.

Referring to FIG. 13, FIG. 13 is a structural diagram of another access node device according to an embodiment of the present invention, where the access node device includes a memory 901 and a processor 902. The memory 901 is configured to store a set of program code, and the processor 902 is configured to read the program code stored in the memory 901, to perform:

receiving a network connection re-establishment trigger message sent by a data gateway, where sending of the network connection re-establishment trigger message is triggered when the data gateway detects that gateway resetting occurs and receives a downlink packet delivered by a packet data network, and a type of the gateway resetting is resetting of a data gateway or resetting of a serving gateway;

determining that the type of the gateway resetting is resetting of a data gateway or resetting of a serving gateway; and re-establishing, according to the type of the gateway resetting, a network connection corresponding to the downlink packet.

Optionally, if the type of the gateway resetting is resetting of a data gateway, the network connection re-establishment trigger message includes a user equipment Internet Protocol address; or if the type of the gateway resetting is resetting of a serving gateway, the network connection re-establishment trigger message includes a user identifier and a bearer identifier that are corresponding to the downlink packet.

Optionally, the network connection re-establishment trigger message may further include a gateway resetting type indication information element, and the gateway resetting type indication information element is used to indicate the type of the gateway resetting.

Optionally, a specific method of performing, by the processor 902, the determining that the type of the gateway resetting is resetting of a data gateway or resetting of a serving gateway may be:

if the network connection re-establishment trigger message includes the user equipment Internet Protocol address, determining that the type of the gateway resetting is resetting of a data gateway, or if the network connection re-establishment trigger message includes the user identifier and the bearer identifier that are corresponding to the downlink packet, determining that the type of the gateway resetting is resetting of a serving gateway; or directly determining, according to the type of the gateway resetting that is indicated by the gateway resetting type indication information element, that the type of the gateway resetting is resetting of a data gateway or resetting of a serving gateway.

Optionally, a specific manner of performing, by the processor 902, the re-establishing, according to the type of the gateway resetting, a network connection corresponding to the downlink packet may be:

if the type of the gateway resetting is resetting of a data gateway, querying, by using the user equipment Internet Protocol address, locally stored user information corresponding to the downlink packet; and determining, by using the user information, that a data gateway and a serving gateway that carry the network connection corresponding to the downlink packet are integrated or independently deployed, where if the data gateway and the serving gateway that carry the network connection corresponding to the downlink packet are integrated, and the serving gateway carries multiple network connections of the user equipment, all data gateways corresponding to the multiple network connections are data gateways integrated with the serving gateway, or data gateways corresponding to the multiple network connections include a data gateway integrated with the serving gateway and a data gateway deployed independently from the serving gateway;

if the data gateway and the serving gateway that carry the network connection corresponding to the downlink packet are integrated, when the user equipment has only one network connection or all data gateways corresponding to the multiple network connections are data gateways integrated with the serving gateway, selecting a new serving gateway and a new data gateway, and re-establishing, on the new serving gateway and the new data gateway, the network connection corresponding to the downlink packet; or when data gateways corresponding to the multiple network connections include a data gateway integrated with the serving gateway and a data gateway deployed independently from the serving gateway, selecting a new serving gateway and a new data gateway, and re-establishing, on the new serving gateway and the new data gateway, the network connection corresponding to the downlink packet, and re-establishing, on the new serving gateway, and updating, on the independently deployed data gateway, the network connection in the foregoing multiple network connections that is carried by the serving gateway and the independently deployed data gateway; or if the data gateway and the serving gateway that carry the network connection corresponding to the downlink packet are independently deployed, when the user equipment has only one network connection, initiating a detach procedure or a packet data network PDN connection deletion procedure to re-establish the network connection that is corresponding to the downlink packet and carried by the data gateway, or when the user equipment has multiple network connections, initiating a PDN connection deletion procedure to re-establish the network connection that is corresponding to the downlink packet and carried by the data gateway;

or, if the type of the gateway resetting is resetting of a serving gateway, querying, by using the user identifier and the bearer identifier, user information corresponding to the downlink packet; and initiating a serving gateway switching procedure to re-establish a network connection of the user equipment;

where: if the UE has only one network connection, when the access node is an MME, the detach procedure is initiated to re-establish the network connection;

if the UE has only one network connection, when the access node is an SGSN, the PDN connection deletion procedure is initiated to re-establish the network connection; or if the UE has multiple network connections, when the access node is either an SGSN or an MME, the PDN connection deletion procedure is initiated to re-establish the network connection.

The foregoing network connection refers to a connection that is established between the user equipment and the packet data network and identified by the Internet Protocol address of the user equipment and an access point name of the packet data network.

Optionally, the foregoing user information is UE context information, PDP context information, or PDN connection information.

Optionally, if the type of the gateway resetting is resetting of a data gateway, before performing the step of the querying, by using the user equipment Internet Protocol address, locally stored user information corresponding to the downlink packet, the processor 902 is further configured to perform:

receiving a bearer update request message forwarded by the serving gateway, where the bearer update request message includes the Internet Protocol address allocated to the user equipment, and the bearer update request message is sent to the serving gateway when the data gateway allocates the Internet Protocol address of the user equipment by using the Dynamic Host Configuration Protocol; and storing the Internet Protocol address into a base of UE context information.

When receiving a network re-establishment trigger message sent by a data gateway, the access node device provided in this embodiment initiates a network connection re-establishment procedure according to a type of gateway resetting, to quickly re-establish a network connection, where sending of the network re-establishment trigger message by the data gateway is triggered in real time by a downlink packet. Therefore, the access node device can quickly initiate a network connection re-establishment procedure, and the access node device provided in this embodiment can be applied to re-establishing a network connection after an integrated gateway is reset.

Figure 14:
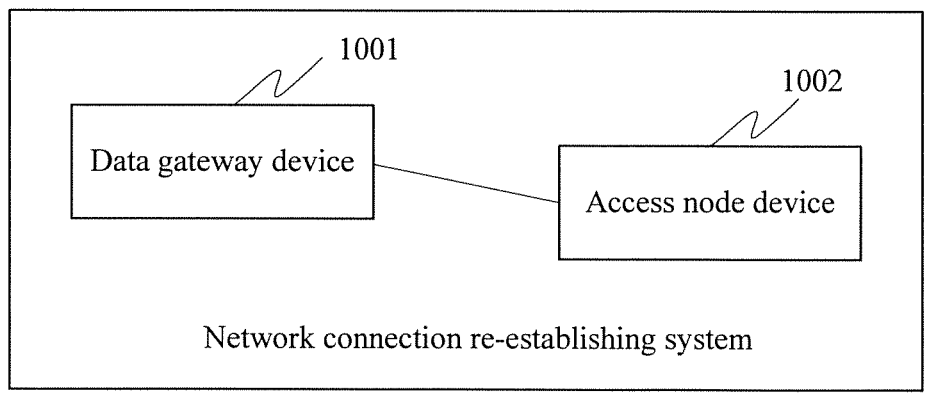
FIG. 14 is a structural diagram of a network connection re-establishment system according to an embodiment of the present invention.

Referring to FIG. 14, FIG. 14 is a structural diagram of a network connection re-establishment system according to an embodiment of the present invention, where the system includes a data gateway device 1001 and an access node device 1002.

The data gateway device 1001 is configured to: when it is detected that gateway resetting occurs, and a downlink packet sent by a packet data network is received, send a network connection re-establishment trigger message to the access node device 1002, where a type of the gateway resetting is resetting of a data gateway or resetting of a serving gateway.

The access node device 1002 is configured to receive the network connection re-establishment trigger message sent by the data gateway device 1001, determine the type of the gateway resetting, and re-establish, according to the type of the gateway resetting, a network connection corresponding to the downlink packet.

Optionally, if the type of the gateway resetting is resetting of a data gateway, the network connection re-establishment trigger message includes a user equipment Internet Protocol address included in the downlink packet; or if the type of the gateway resetting is resetting of a serving gateway, the network connection re-establishment trigger message includes a user identifier and a bearer identifier that are corresponding to the downlink packet.

Optionally, the network connection re-establishment trigger message may further include a gateway resetting type indication information element, and the gateway resetting type indication information element is used to indicate the type of the gateway resetting.

Optionally, if the type of the gateway resetting is resetting of a serving gateway, the data gateway device detects, by using path detection, a restart counter, or an error indication message, whether the serving gateway is reset.

In the network connection re-establishment system provided in this embodiment, after gateway resetting that includes resetting of a data gateway and resetting of a serving gateway occurs, a data gateway device is triggered by a downlink packet to send a network connection trigger message to an access node device, and the access node device initiates a network connection re-establishment procedure. In the embodiment of the present invention, quick re-establishing of a network connection after the gateway resetting is triggered in real time by the downlink packet, which can quickly re-establish the network connection, and can be applied to re-establishing a network connection after an integrated gateway is reset.

A person of ordinary skill in the art may understand that all or some of the processes of the methods in the embodiments may be implemented by a computer program instructing relevant hardware. The program may be stored in a computer-readable storage medium. When the program runs, the processes of the foregoing methods in the embodiments are performed. The foregoing storage medium may include: a magnetic disk, an optical disc, a read-only memory (Read-Only Memory, ROM), or a random access memory (Random Access Memory, RAM)

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A network connection re-establishment method, comprising:
   receiving, at an access node of a radio access network, a network connection re-establishment trigger message from a data gateway of a packet data network, wherein the network connection re-establishment trigger message is sent in response to the data gateway detection of that a gateway resetting and reception of a downlink packet delivered by the packet data network, the downlink packet comprising data to be transmitted by the access node to a user equipment;
   determining, at the access node, based on whether the network connection re-establishment trigger message comprises (i) an Internet Protocol address of the user equipment or (ii) a user identifier and a bearer identifier that correspond to the downlink packet, whether a type of the gateway resetting is resetting of the data gateway or resetting of a serving gateway communicatively coupled to the radio access network; and
   re-establishing, at the access node, according to the type of the gateway resetting, a network connection of the user equipment.

2. The method according to claim 1, wherein:
   when the type of the gateway resetting is resetting of the data gateway, the network connection re-establishment trigger message comprises the Internet Protocol address of the user equipment; and
   when the type of the gateway resetting is resetting of the serving gateway, the network connection re-establishment trigger message comprises the user identifier and the bearer identifier that correspond to the downlink packet.

3. The method according to claim 2, wherein determining whether a type of the gateway resetting is resetting of the data gateway or resetting of a serving gateway communicatively coupled to the radio access network comprises:
   when the network connection re-establishment trigger message comprises the Internet Protocol address of the user equipment, determining that the type of the gateway resetting is resetting of the data gateway; and
   when the network connection re-establishment trigger message comprises the user identifier and the bearer identifier that correspond to the downlink packet, determining that the type of the gateway resetting is resetting of the serving gateway.

4. The method according to claim 2, wherein when the type of the gateway resetting is resetting of the data gateway, re-establishing the network connection comprises:
   querying, by using the Internet Protocol address of the user equipment, locally stored user information corresponding to the downlink packet; and
   determining, by using the user information, that a data gateway and a serving gateway that carry the network connection are integrated or independently deployed.

5. The method according to claim 4, wherein re-establishing the network connection further comprises:
   when the data gateway and the serving gateway that carry the network connection corresponding to the downlink packet are integrated, when the user equipment has only one network connection or all data gateways corresponding to multiple network connections are data gateways integrated with the serving gateway, selecting a new serving gateway and a new data gateway, and re-establishing, on the new serving gateway and the new data gateway, the network connection corresponding to the downlink packet.

6. The method according to claim 4, wherein re-establishing the network connection further comprises:
   when the data gateway and the serving gateway that carry the network connection corresponding to the downlink packet are integrated, when data gateways corresponding to multiple network connections comprise a data gateway integrated with the serving gateway and a data gateway deployed independently from the serving gateway, selecting a new serving gateway and a new data gateway, and re-establishing, on the new serving gateway and the new data gateway, the network connection corresponding to the downlink packet, and updating, on the independently deployed data gateway, the network connection in the multiple network connections that is carried by the serving gateway and the independently deployed data gateway.

7. The method according to claim 4, wherein re-establishing the network connection further comprises:
   when the data gateway and the serving gateway that carry the network connection corresponding to the downlink packet are independently deployed, and the user equipment has only one network connection, initiating a detach procedure or a packet data network (PDN)

connection deletion procedure to re-establish the network connection that is corresponds to the downlink packet and is carried by the data gateway; and when the data gateway and the serving gateway that carry the network connection corresponding to the downlink packet are independently deployed, when the user equipment has multiple network connections, initiating a PDN connection deletion procedure to re-establish the network connection that corresponds to the downlink packet and is carried by the data gateway.

8. The method according to claim 2, wherein when the type of the gateway resetting is resetting of the serving gateway, re-establishing the network connection comprises:

querying, by using the user identifier and the bearer identifier, user information corresponding to the downlink packet; and initiating a serving gateway switching procedure to re-establish the network connection of the user equipment.

9. An access node device of a radio access network, the access node device comprising:

a receiver, configured to receive a network connection re-establishment trigger message from a data gateway of a packet data network, wherein the network connection re-establishment trigger message is sent in response to the data gateway detection of a gateway resetting and reception of a downlink packet delivered by the packet data network, the downlink packet comprising data to be transmitted by the access node device to a user equipment; and a processor, configured to:
determine, based on whether the network connection re-establishment trigger message comprises (i) an Internet Protocol address of the user equipment or (ii) a user identifier and a bearer identifier that correspond to the downlink packet, whether a type of the gateway resetting is resetting of the data gateway or resetting of a serving gateway communicatively coupled to the radio access network; and re-establish, according to the type of the gateway resetting, a network connection of the user equipment.

10. The access node device according to claim 9, wherein:

when the type of the gateway resetting is resetting of the data gateway, the network connection re-establishment trigger message comprises the Internet Protocol address of the user equipment; and when the type of the gateway resetting is resetting of the serving gateway, the network connection re-establishment trigger message comprises the user identifier and the bearer identifier that correspond to the downlink packet.

11. The access node device according to claim 10, wherein when the type of the gateway resetting is resetting of the data gateway, the processor is configured to:

query, by using the Internet Protocol address of the user equipment, locally stored user information corresponding to the downlink packet; and determine, by using the user information, that a data gateway and a serving gateway that carry the network connection are integrated or independently deployed.

12. The access node device according to claim 11, wherein the processor is configured to: when the data gateway and the serving gateway that carry the network connection are integrated, and the user equipment has only one network connection or all data gateways corresponding to multiple network connections are data gateways integrated with the serving gateway, select a new serving gateway and a new data gateway, and re-establish, on the new serving gateway and the new data gateway, the network connection.

13. The access node device according to claim 11, wherein the processor is configured to: when the data gateway and the serving gateway that are of the network connection are integrated, and data gateways corresponding to multiple network connections comprise a data gateway integrated with the serving gateway and a data gateway deployed independently from the serving gateway, select a new serving gateway and a new data gateway, and re-establish, on the new serving gateway and the new data gateway, the network connection, and update, on the independently deployed data gateway, the network connection in the multiple network connections that is carried by the serving gateway and the independently deployed data gateway.

14. The access node device according to claim 11, wherein the processor is configured to:

when the data gateway and the serving gateway that are of the network connection corresponding to the downlink packet are independently deployed, and the user equipment has only one network connection, initiate a detach procedure or a packet data network (PDN) connection deletion procedure to re-establish the network connection that corresponds to the downlink packet and is carried by the data gateway; and when the data gateway and the serving gateway that are of the network connection corresponding to the downlink packet are independently deployed, and the user equipment has multiple network connections, initiate a PDN connection deletion procedure to re-establish the network connection that corresponds to the downlink packet and is carried by the data gateway.

15. The access node device according to claim 11, wherein:

the receiver is further configured to receive a bearer update request message from the serving gateway, wherein the bearer update request message comprises the Internet Protocol address allocated to the user equipment, and the bearer update request message is sent to the serving gateway when the data gateway allocates the Internet Protocol address of the user equipment; and the processor is configured to store the Internet Protocol address into a base of context information of the user equipment.

16. The access node device according to claim 10, wherein when the type of the gateway resetting is resetting of the serving gateway, the processor is configured to:

query, by using the user identifier and the bearer identifier, user information corresponding to the downlink packet; and initiate a serving gateway switching procedure to re-establish the network connection corresponding to the user equipment.

17. A network connection re-establishment system, comprising:

a data gateway device of a packet data network and an access node device of a radio access network;

wherein the data gateway device is configured to: when it is detected that a gateway resetting occurs, and a downlink packet sent by the packet data network is received, send a network connection re-establishment trigger message to the access node device, wherein a type of the gateway resetting is resetting of the data gateway device or resetting of a serving gateway communicatively coupled to the radio access network, wherein the downlink packet comprises data to be transmitted by the access node device to a user equipment; and wherein the access node device is configured to:
- receive the network connection re-establishment trigger message sent by the data gateway device,
- determine a type of the gateway resetting based on whether the network connection re-establishment trigger message comprises (i) an Internet Protocol address of the user equipment or (ii) a user identifier and a bearer identifier that correspond to the downlink packet, and
- re-establish, according to the type of the gateway resetting, a network connection of the user equipment.

\* \* \* \* \*